US012807251B2

(12) United States Patent
Van Mill et al.

(10) Patent No.: US 12,807,251 B2

(45) Date of Patent: Nov. 24, 2026

(54) TRACK AXLE SUSPENSION FOR A FARM IMPLEMENT

(71) Applicant: Unverferth Manufacturing Company, Inc., Kalida, OH (US)

(72) Inventors: Michael D. Van Mill, Shell Rock, IA (US); John Walvatne, Parkersburg, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 19/308,581

(22) Filed: Aug. 25, 2025

(65) Prior Publication Data

US 2026/0116481 A1 Apr. 30, 2026

Related U.S. Application Data

(60) Provisional application No. 63/713,323, filed on Oct. 29, 2024.

(51) Int. Cl.
*B62D 55/108* (2006.01)
*A01D 90/10* (2006.01)

(52) U.S. Cl.
CPC ............ *B62D 55/108* (2013.01); *A01D 90/10* (2013.01)

(58) Field of Classification Search
CPC .... B62D 55/06; B62D 55/104; B62D 55/084; B62D 55/108; B62D 55/112; B62D 55/116; B62D 55/14; B62D 55/305
See application file for complete search history.

(56) References Cited

U.S. PATENT DOCUMENTS

| | | | | |
|---|---|---|---|---|
| 3,894,598 A * | 7/1975 | Yeou | B62D 55/084 280/638 |
| 4,576,390 A | 3/1986 | Vos | |
| 6,068,276 A | 5/2000 | Kallstrom | |
| 6,145,610 A * | 11/2000 | Gallignani | B62D 55/084 180/906 |
| 6,349,952 B1 * | 2/2002 | Kallstrom | B60G 11/27 280/6.151 |
| 7,252,169 B2 | 8/2007 | McLean et al. | |
| 9,457,854 B2 | 10/2016 | Van Mill et al. | |
| 10,518,580 B2 * | 12/2019 | Moen | B60B 35/109 |
| 10,618,577 B2 * | 4/2020 | Ng | B62D 55/084 |
| 11,926,327 B2 * | 3/2024 | Fields | B60W 30/188 |
| 2005/0224262 A1 * | 10/2005 | Ima | B60K 17/22 180/53.6 |

(Continued)

*Primary Examiner* — Toan C To

(74) *Attorney, Agent, or Firm* — ROTHWELL, FIGG, ERNST & MANBECK, P.C.

(57) ABSTRACT

A farm implement including a main axle mounted to the farm implement and positioned perpendicular to a direction of travel of the farm implement. The main axle has first and second ends having respective openings. The farm implement includes first and second suspension axles pivotably coupled by first and second pivots to the main axle on an axis parallel to the direction of travel. The first suspension axle is within the first opening of the first end of the main axle and the second suspension axle is within the second opening of the second end of the main axle. The first pivot is located at a first position between a center of the main axle and the first end of the main axle, and the second pivot is located at a second position between the center of the main axle and the second end of the main axle.

11 Claims, 6 Drawing Sheets

(56) References Cited

U.S. PATENT DOCUMENTS

| | | | | |
|---|---|---|---|---|
| 2010/0060075 | A1* | 3/2010 | Hansen | B62D 55/084 305/15 |
| 2019/0359267 | A1* | 11/2019 | Ng | B62D 55/06 |
| 2021/0253185 | A1* | 8/2021 | Sauvageau | B62D 55/065 |
| 2023/0227115 | A1 | 7/2023 | Van Mill et al. | |

* cited by examiner

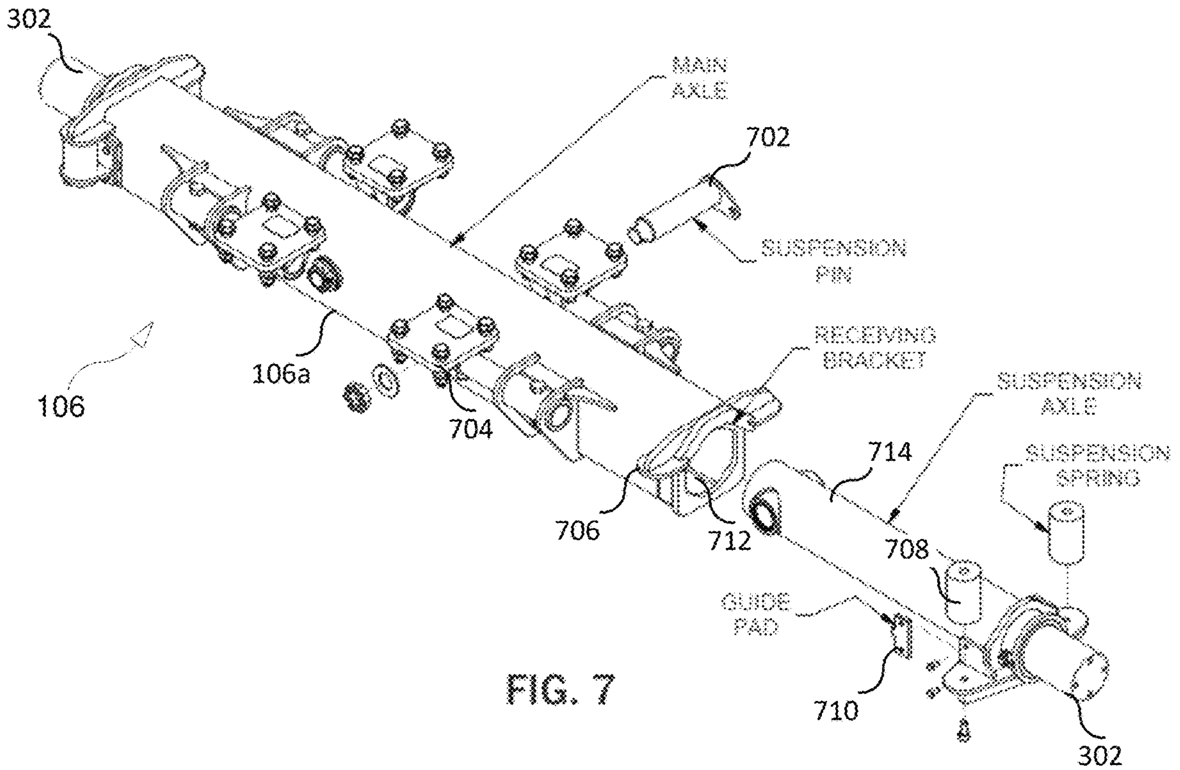
FIG. 7
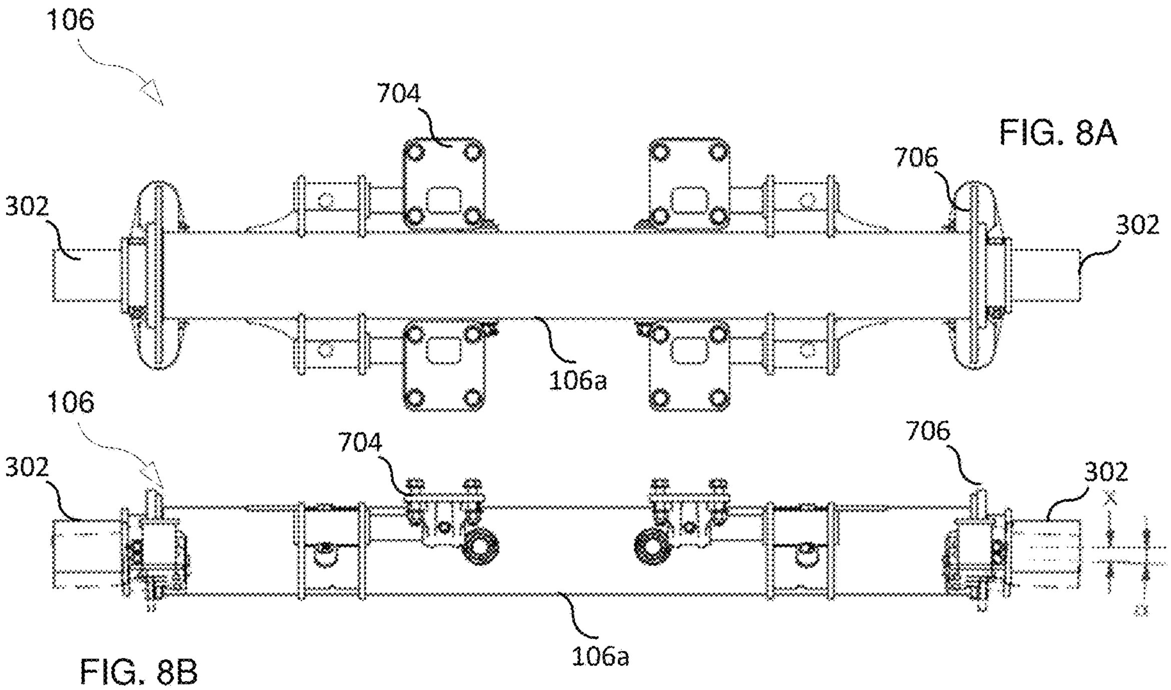
FIG. 8A
FIG. 8B

NO LOAD

WITH CART EMPTY WEIGHT

FULLY COMPRESSED

TRACK AXLE SUSPENSION FOR A FARM IMPLEMENT

CROSS REFERENCE TO RELATED APPLICATIONS

This application claims priority to U.S. Provisional Application No. 63/713,323, filed Oct. 29, 2024, the entire disclosures of which is incorporated by reference herein in its entirety for all purposes.

FIELD OF THE DISCLOSURE

This disclosure relates generally to farm implements, and more particular, to a track axle suspension for a farm implement such that the farm implement is better able to move along the terrain when the farm implement is towed behind a tractor or otherwise moved.

BACKGROUND

Mobile farm implements may generally include wheels or track assemblies to support the frame and allow a tow vehicle such as a tractor to move the farm implement. Mobile farm implements such as grain carts, seed tenders, and sprayers are used in fields in which the terrain may be uneven. They may also be moved along roadways or other hard (e.g., paved) surfaces. Typically when moving along roadways or other hard surfaces, the farm implement is unloaded and may be moving at a relatively high speed (e.g., 20-30 mph), whereas when it is used in fields, it may be loaded with agricultural material and moving at a relatively low speed. The speed and weight differences between loaded and unloaded states, and between moving along roadways or other hard (e.g., paved) surfaces and fields, can make it hard to design an effective suspension system. Poor suspension may cause stress on the wheels or track assemblies or the farm implement, which may cause failure or increased wear. In the case of towable farm implements, the farm implements are also required to closely follow the path of a tow vehicle to avoid moving off the path and damaging crops. Moving at relatively high speeds along roadways or other hard (e.g., paved) surfaces may also result in failure or increased wear.

SUMMARY

In particular, farm implements can see high frequency vibration when running empty (unloaded) on hard surfaces at high speeds. This vibration can cause fatigue cracking in some lighter gauge panels and welds. The vibrations can also cause issues for bolted joints, such as the bolted joints working lose due to the vibrations. Accordingly, there is a need to develop a suspension system capable of limiting vibration. Various suspension methods and designs have been explored, including adding suspension to various track assemblies as well integrating the suspension into the axle. It was determined that the addition of suspension to the track assemblies produced various challenges related to design, assembly and cost, making it advantageous to design the suspension into the axle. Also, since the axles are typically designed for specific cart models and capacities it was easier to design the suspension around specific weights, rather than in the track assemblies which are used over a wider range of models and capacities. Designing the suspension into the axle also allowed for a reduction in the number of components needed, simplifying the system and reducing overall cost. It also allows for use of the suspension design with wheeled farm implements, not just farm implements with a track assembly.

According to a first aspect, embodiments of a farm implement are provided. The farm implement includes a main axle mounted to the farm implement and positioned perpendicular to a direction of travel of the farm implement and extending in a lateral direction with respect to the farm implement. The main axle has first and second ends along a longitudinal direction of the main axle, and the first and second ends have first and second openings, respectively. The farm implement includes first and second suspension axles pivotably coupled by first and second pivots to the main axle on an axis parallel to the direction of travel of the farm implement. The first suspension axle is within the first opening of the first end of the main axle and the second suspension axle is within the second opening of the second end of the main axle. The first pivot is located at a first position between a center of the main axle and the first end of the main axle, and the second pivot is located at a second position between the center of the main axle and the second end of the main axle.

In some embodiments, one or both of the first pivot and the second pivot is located closer to the center of the main axle than the respective first or second end of the main axle. In some embodiments, a first suspension spring connected between the first suspension axle and the main axle supports an outer end of the first suspension axle and allows for movement of the first suspension axle in a generally vertical direction, the first suspension spring being located outside of the main axle. In some embodiments, a second suspension spring connected between the second suspension axle and the main axle supports an outer end of the second suspension axle and allows for movement of the second suspension axle in a generally vertical direction, the second suspension spring being located outside of the main axle. In some embodiments, the farm implement further includes a first guide pad mounted externally between the main axle and the first suspension axle; and a second guide pad mounted externally between the main axle and the second suspension axle. The first suspension spring may include one or more springs (e.g., two springs located on opposing lateral sides of the end of the first suspension axle). The second suspension spring may include one or more springs (e.g., two springs located on opposing lateral sides of the end of the second suspension axle). The first guide pad may include one or more guide pads (e.g., corresponding to each spring of the first suspension spring). The second guide pad may include one or more guide pads (e.g., corresponding to each spring of the second suspension spring).

In some embodiments, the farm implement comprises a grain cart, and one or both of the first suspension spring and the second suspension spring has a spring length of about 6 inches without load, a spring length of about 5.375 inches when the grain cart is empty, and a spring length of about 4.75 inches when the grain cart is full. In some embodiments, the farm implement comprises a grain cart, and one or both of the first suspension spring and the second suspension spring is configured to achieve maximum compression when the grain cart is from 30%-50% of its maximum loaded weight. In some embodiments, the farm implement comprises a grain cart, and one or both of the first suspension spring and the second suspension spring is configured to achieve maximum compression when the grain cart is at about twice its empty weight. In some embodiments, the farm implement comprises a grain cart, and an angle of one or both of the first suspension axle and the second suspension axle relative to the main suspension axle is about 2° when the grain cart is empty, and about 0° when the grain cart is full. In some embodiments, a common longitudinal axis of the main axle passes through both the first and second ends of the main axle.

In some embodiments, the main axle and the first and second suspension axles are each generally cylindrically shaped. In some embodiments, the farm implement further includes a hopper having an opening for receiving agricultural material, whereby the main axle and first and second suspension axles provide suspension for the hopper. In some embodiments, the main axle comprises a first receiving bracket adjacent to the first end and a second receiving bracket adjacent to the second end, such that when the first suspension spring is at maximum compression an outer end of the first suspension axle contacts the first receiving bracket which acts as a vertical stop for the first suspension axle and when the second suspension spring is at maximum compression an outer end of the second suspension axle contacts the second receiving bracket which acts as a vertical stop for the second suspension axle. In some embodiments, the first and/or second receiving brackets are configured to provide support for one or both of vertical and fore-and-aft loads when the first and/or second suspension springs are at maximum compression. This configuration may be a result of the shape of the first and/or second receiving brackets in some embodiments.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 7 is a perspective, partially exploded view of an axle for a farm implement according to an embodiment.

FIG. 8A is a top view of an axle for a farm implement according to an embodiment.

FIG. 8B is a rear view of an axle for a farm implement.

DETAILED DESCRIPTION

Figure 1:
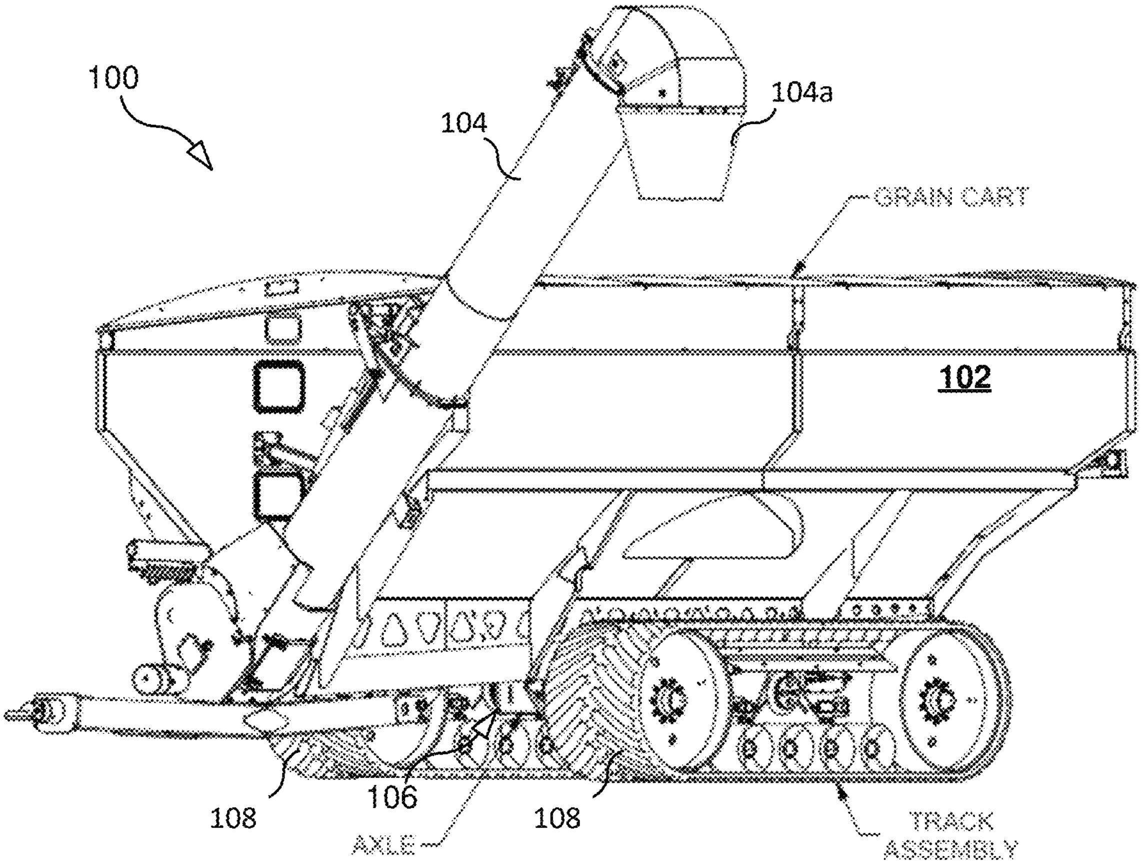
FIG. 1 is a perspective view of a farm implement according to an embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, “a” or “an” means “at least one” or “one or more.”

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term “adjacent” refers to being near or adjoining. Adjacent objects can be spaced apart from one another or can be in actual or direct contact with one another. In some instances, adjacent objects can be coupled to one another or can be formed integrally with one another.

As used herein, the terms “substantially” and “substantial” refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Although the terms horizontal and vertical are used here with respect to augers, such augers may not be completely horizontal or completely vertical. For example, the vertical auger may be angled so as to increase a side reach and/or forward reach of the auger relative to the hopper. Likewise, the horizontal auger may have a slope to it, and may also move with the hopper as the grain cart travels over uneven terrain. The terms denote the general direction in which grain is moved, e.g. horizontal movement to displace grain to a lift auger or vertical movement to lift grain to a discharge height.

Figure 2:
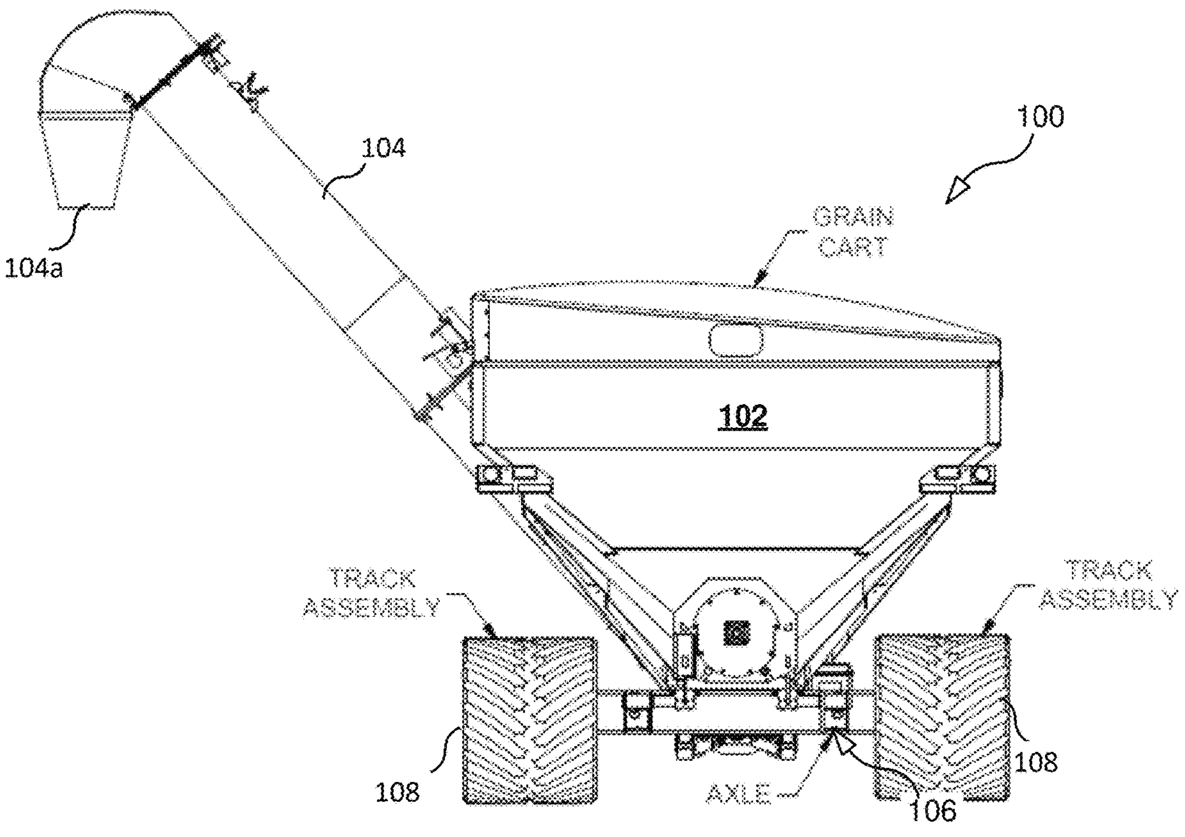
FIG. 2 is a rear view of a farm implement according to an embodiment.
Figure 3:
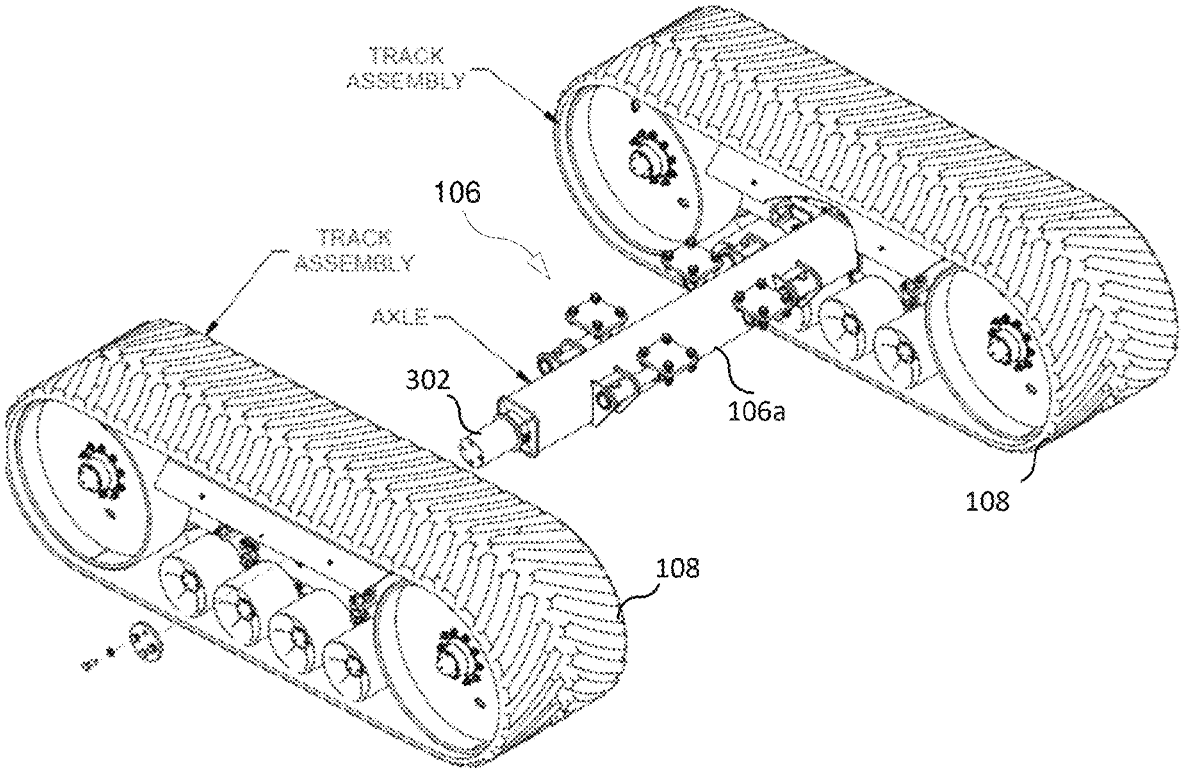
FIG. 3 is a perspective, partially exploded view of an axle for a farm implement according to an embodiment.

Referring now to FIGS. 1, 2, and 3, an exemplary mobile farm implement 100 is shown according to an embodiment. In this example, mobile farm implement 100 is a grain cart, though in other examples different kinds of farm implements (e.g., seed tenders and sprayers) could be utilized. Mobile farm implement 100 includes a hopper 102 for holding agricultural material (e.g., grain), and an auger 104 for moving the agricultural material out of the hopper for unloading. Agricultural material may leave the auger 104 through the auger's discharge spout 104*a*. Mobile farm implement 100 is capable of moving via track assembly 108. One type of track assembly for a farm implement is provided by U.S. Pat. No. 9,457,854, the content of which is hereby incorporated in its entirety. Other types of farm implements other than what is shown here are within the scope of disclosed embodiments, including farm implements without augers, hoppers, or track assemblies, or with augers, hoppers, and/or track assemblies that differ from what is shown here. For example, an axle suspension according to embodiments disclosed herein may be used with a wheeled farm implement. As another example, the track assembly of the farm implement may have different lengths, widths, and numbers of bogie wheels associated with it. The track assembly may be one of the standard track, the Equalizer track, or the Equalizer SP track, among others.

As shown, the farm implement 100 is mounted to an axle 106 that extends in a lateral direction with respect to the farm implement 100 and is pivotably coupled on each end to a track assembly 108. The axle 106 may include a main axle 106*a* (which is shown as a horizontal structural member) orientated perpendicular to the direction of travel, and a suspension axle (shown as suspension axle 714 in FIG. 7) inserted into the ends of main axle 106*a*, with a portion 302 extending out from the main axle 106*a* beyond the receiving bracket 706. On each end of the axle 106 there may be a pin (shown in FIG. 7 as suspension pin 702) that is received into the track assembly 108, allowing the tracks 108 to tilt about an axis perpendicular to the direction of travel. Each of U.S. Pat. No. 9,457,854 and U.S. application Ser. No. 17/577,193 discloses track assemblies that may be used with disclosed embodiments herein, and the contents of these are hereby incorporated in their entirety.

Figure 4:
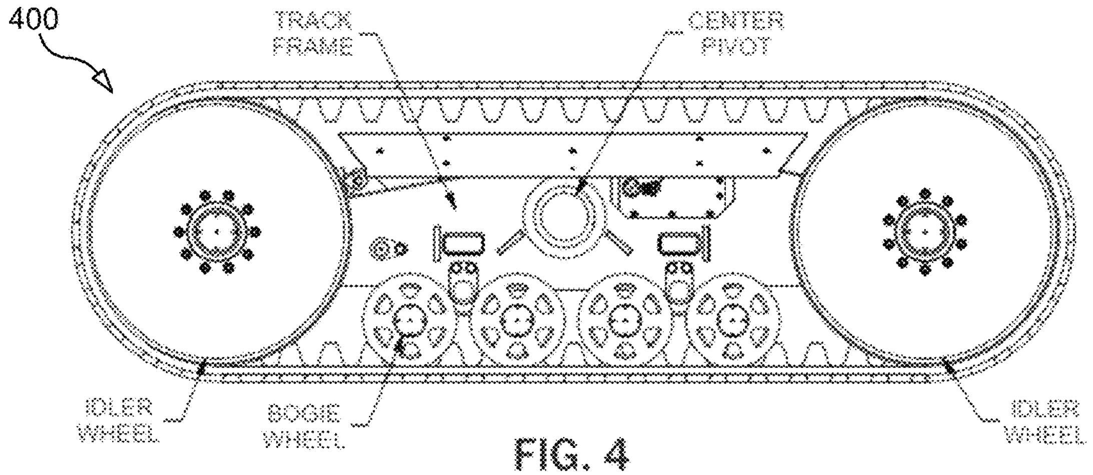
FIG. 4 is a side view of a track assembly according to an embodiment.

FIG. 4 illustrates an example of a track 400 according to an embodiment. Track 400 is referred to as the standard track for purposes of this disclosure. Track 400 includes a frame positioned between an inner and outer set of front and rear idler wheels. On one end of the track there is a tensioner for tensioning the belt using the idler wheels, and on one end of the track there is also a method for adjusting alignment with the idler wheels to keep the belt centered. The bogie wheels are pivotably coupled to the frame in an axis perpendicular to the direction of travel, allowing them to conform to uneven terrain. The center pivot that mounts to the axle is only allowed to rotate about an axis perpendicular to the direction of travel. This track system provides no means of vibration isolation or suspension. However, the track 400 may be used with the track axle suspension described herein to provide vibration isolation or suspension.

Figure 5:
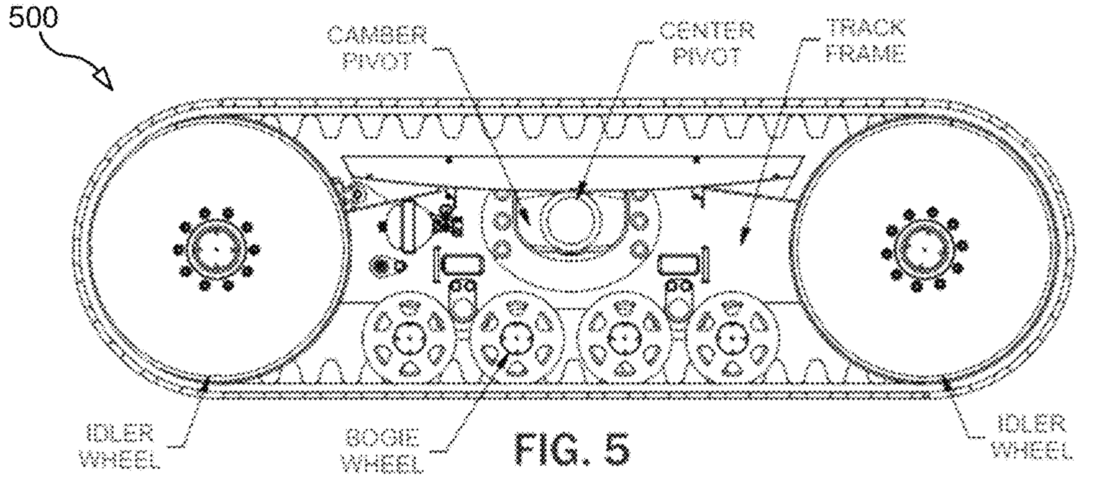
FIG. 5 is a side view of a track assembly according to an embodiment.

FIG. 5 illustrates an example of a track 500 according to an embodiment. Track 500 is referred to as the Equalizer track for purposes of this disclosure. Track 500 includes a frame positioned between an inner and outer set of front and rear idler wheels. On one end of the track there is a tensioner for tensioning the belt using the idler wheels, and on one end of the track there is also a method for adjusting alignment with the idler wheels to keep the belt centered. The bogie wheels are pivotably coupled to the frame in an axis perpendicular to the direction of travel, allowing them to conform to uneven terrain. The center pivot that attaches to the axle allows the track to rotate about an axis perpendicular to the direction of travel. The center pivot is also coupled to a camber pivot that allows the track to rotate about an axis parallel to the direction of travel, allowing better conformity of the track to uneven terrain. Track 500 is further described in U.S. Pat. No. 9,457,854, the content of which is hereby incorporated in its entirety. This track system provides no means of vibration isolation or suspension. However, the track 500 may be used with the track axle suspension described herein to provide vibration isolation or suspension.

Figure 6:
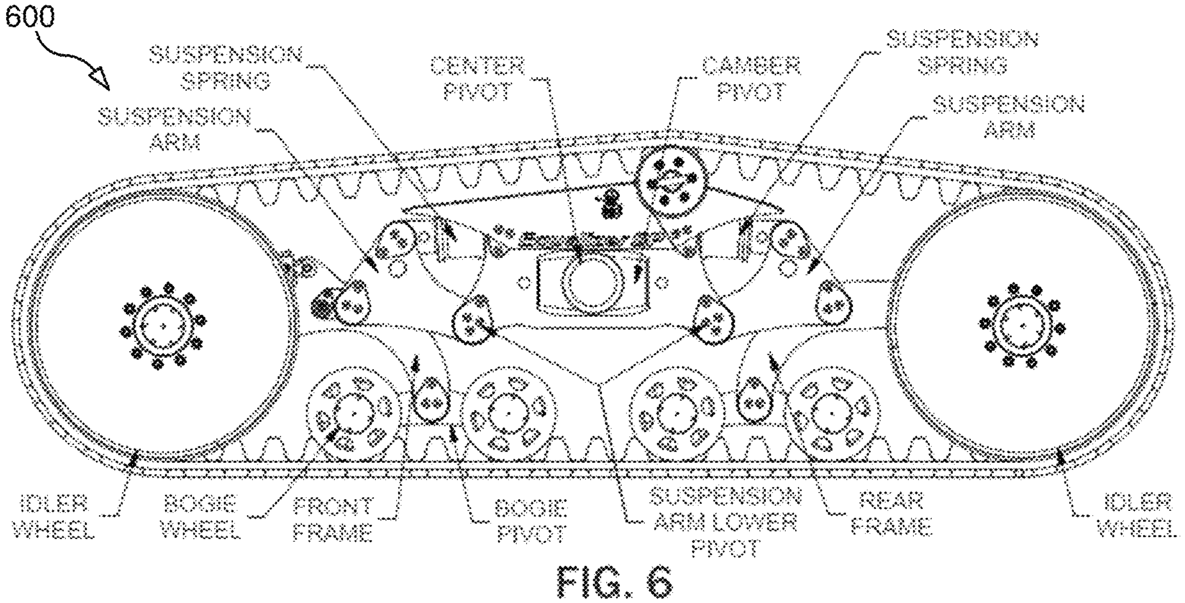
FIG. 6 is a side view of a track assembly according to an embodiment.

FIG. 6 illustrates an example of a track 600 according to an embodiment. Track 600 is referred to as the Equalizer SP track for purposes of this disclosure. Track 600 includes a plurality of frame members pivotably coupled together, positioned between an inner and outer set of front and rear idler wheels. On one end of the track there is a tensioner for tensioning the belt using the idler wheels, and on one end of the track there is also a method for adjusting alignment with the idler wheels to keep the belt centered. The bogie wheel spindles are pivotably coupled to the bogie pivot arm, allowing rotation in an axis parallel to the direction of travel. The bogie pivot is pivotably coupled to the front or rear frame member in an axis perpendicular to the direction of travel. The additional pivot in the bogie spindles allows better conformity of the track system to uneven terrain. The front and rear frame are pivotably connected to a suspension arm having a lower pivot connected to the center camber arm housing and an upper pivot connected to a suspension spring. The suspension arm and suspension spring are orientated in such a way that with a load applied to the frame the suspension allows the main pivot to move in a vertical direction. The center pivot that attaches to the axle allows the track assembly to rotate about an axis perpendicular to the direction of travel. The center pivot is also coupled to a camber pivot that allows the track to rotate about an axis parallel to the direction of travel, allowing better conformity of the track to uneven terrain. This track assembly was designed for larger grain carts to reduce the empty-to-low load vibrations seen both in lower speeds in the field as well as higher speeds on gravel or dirt roads. Track 600 is further described in U.S. application Ser. No. 17/577,193, the content of which is hereby incorporated in its entirety. Track 600 may be used with the track axle suspension described herein to provide vibration isolation or suspension.

Referring now to FIGS. 7 and 8, the suspension axle 106 includes a main axle 106*a* that is mounted to the farm implement. The main axle 106*a* is positioned perpendicular to the direction of travel and extends in a lateral direction with respect to the farm implement. There is an opening 712 extending in each of the ends of the main axle 106*a*, and the main axle 106*a* is configured to accept a suspension axle 714 that is pivotably coupled to the main axle 106*a* on an axis parallel to the line of travel. A portion 302 of the suspension axle 714 extends out from the main axle 106*a* in which the suspension axle 714 is inserted. In embodiments, such as the one shown in FIGS. 7 and 8, the main axle and suspension axles are each generally cylindrically shaped, and may have diameters so that the suspension axles may be received within the main axle.

The pivot for the suspension axle 714 is located at some position between the center and end of the main axle 106*a*, but preferably more towards the center. As shown, the pivot is at the suspension pin 702, which provides a pivot point for the suspension axle 714. Positioned near the suspension pin 702 is a mounting bracket 704 on the top side of the main axle 106*a*, which may support mounting of the axle 106 to a frame of the farm implement. The outer end of the suspension axle 714 is supported by a suspension spring 708 connected between the suspension axle 714 and main axle 106*a*, which allows movement generally in the vertical direction. The suspension spring 708 (two are shown on each end of the main axle 106*a*) is located outside the main axle 106*a*, in this case to the front and rear, making it accessible for ease of assembly or replacement. Guide pads 710 are used to support the outer end of the suspension axle 714 for side forces and are mounted externally between the main axle 106*a* and suspension axle 714. A receiving bracket 706 facilitates the reception of the suspension axle 714 within the main axle 106*a*. The dashed lines in FIG. 8B indicate the movement of the suspension axle 714. In particular, the suspension axle 714 is capable of moving a distance "x" (shown in FIG. 8B) in a generally vertical direction, pivoting by suspension pin 702 up to an angle of +a (shown in FIG. 8B). Values of "x" and a may vary depending on a number of factors, including the size of the farm implement, the expected weight of the farm implement when unloaded and/or loaded, and the speed it is expected to reach on various types of surfaces.

Figure 9:
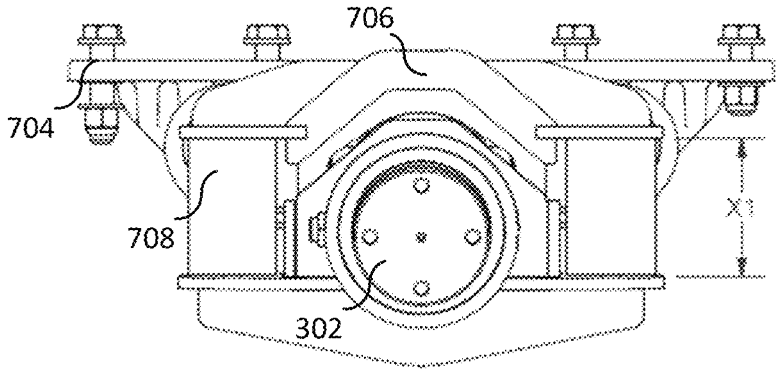
FIG. 9 is a side or end view of an axle for a farm implement according to an embodiment.
Figure 10:
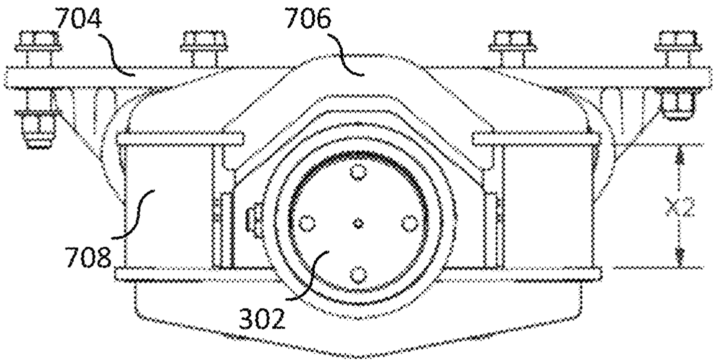
FIG. 10 is a side or end view of an axle for a farm implement according to an embodiment.
Figure 11:
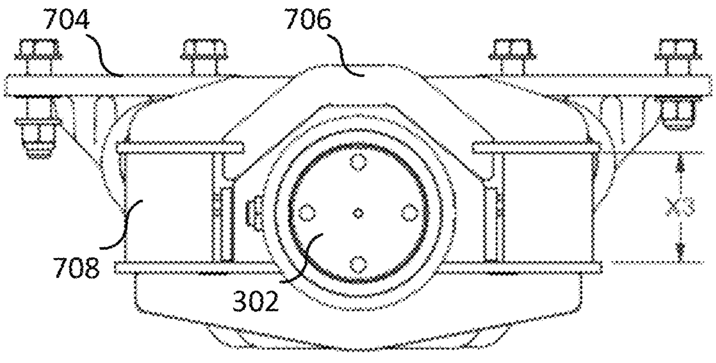
FIG. 11 is a side or end view of an axle for a farm implement according to an embodiment.

Referring now to FIGS. 9, 10, and 11, a view of axle 106 looking at a portion 302 extending out from the main axle 106*a* is shown with no load, the farm implement at an empty weight, and fully compressed, where the suspension spring has maxed out. When the axle 106 is assembled without any load, the outer end of the suspension axle 714 is in its lowest position with the spring fully extended and having a height "X1" (shown in FIG. 9). With the weight of the empty farm implement applied to the axle, the springs begin to compress to a desired operating height "X2" (shown in FIG. 10). At a predetermined weight or grain capacity, the suspension spring reaches a maximum compression at height "X3" (shown in FIG. 11) and the outer end of the suspension axle will contact a receiving bracket on the main axle. The profiled portion on the suspension axle will fit into the receiving bracket intended as a vertical stop for the suspension, to prevent overloading the spring, as well as to carry some of the side forces with the springs fully compressed. The profile of the top edge of the suspension axle and receiving bracket could vary depending on the forces and amount of contact required. In one example the spring has a free length "X1" of about 6" (FIG. 9), with the weight of the cart the operating height of the spring reducing the height to "X2" of about 5.375" (FIG. 10) (for 0.625" of spring compression), and at max capacity the suspension axle bottoms out at "X3" with a spring height of about 4.75" (FIG. 11) (1.25" of spring compression). These values may vary depending on the particular farm implement the axle is being designed for.

FIG. 8B indicates that as the height of the suspension changes the angle of the track pivot shaft changes as well. In one example with the spring at full extension, the angle of the track pivot pin is at a downward angle of 2°. As the load increases the angle decreases until the suspension axle contacts the receiving bracket and the track pivot pin angle is 0°. The spring design, amount of suspension movement, initial and final angles of the pivot shaft all depend on the design goals and can be varied to achieve the desired results.

The design load and final load capacity of the springs can be varied as well. In one example the design load is equal to the empty cart weight and the spring is designed to bottom out when the weight is 2× the static empty weight. The suspension could also be designed to carry the entire loaded cart weight, bottoming out at 30%-50% above the max loaded cart weight. A person of ordinary skill in the art will understand, in view of the disclosure provided herein, that a range of the angle of the track pivot pin as the load changes from empty to full, may depend in part on the type of track. For example, the range may be smaller if a standard track (as shown in FIG. 4) is used, as compared with an Equalizer or Equalizer SP track (as shown in FIGS. 5-6).

In some embodiments, any one or more of the springs disclosed herein may be replaced with or used in addition to other forms of suspension, e.g., including one or more struts, shocks, airbags, or cylinders.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:

a main axle mounted to the farm implement and positioned perpendicular to a direction of travel of the farm implement and extending in a lateral direction with respect to the farm implement, wherein the main axle has first and second ends along a longitudinal direction of the main axle, and the first and second ends have first and second openings, respectively; and first and second suspension axles pivotably coupled by first and second pivots to the main axle on an axis parallel to the direction of travel of the farm implement, wherein the first suspension axle is within the first opening of the first end of the main axle and the second suspension axle is within the second opening of the second end of the main axle;

wherein the first pivot is located at a first position between a center of the main axle and the first end of the main axle, and the second pivot is located at a second position between the center of the main axle and the second end of the main axle.

2. The farm implement of claim 1, wherein one or both of the first pivot and the second pivot is located closer to the center of the main axle than the respective first or second end of the main axle.

3. The farm implement of claim 1, wherein a first suspension spring connected between the first suspension axle and the main axle supports an outer end of the first suspension axle and allows for movement of the first suspension axle in a generally vertical direction, the first suspension spring being located outside of the main axle.

4. The farm implement of claim 3, wherein a second suspension spring connected between the second suspension axle and the main axle supports an outer end of the second suspension axle and allows for movement of the second suspension axle in a generally vertical direction, the second suspension spring being located outside of the main axle.

5. The farm implement of claim 3, further comprising:

a first guide pad mounted externally between the main axle and the first suspension axle; and a second guide pad mounted externally between the main axle and the second suspension axle.

6. The farm implement of claim 3, wherein the farm implement comprises a grain cart, and wherein one or both of the first suspension spring and the second suspension spring has a spring length of about 6 inches without load, a spring length of about 5.375 inches when the grain cart is empty, and a spring length of about 4.75 inches when the grain cart is full.

7. The farm implement of claim 3, wherein the farm implement comprises a grain cart, and wherein one or both of the first suspension spring and the second suspension spring is configured to achieve maximum compression when the grain cart is from 30%-50% of its maximum loaded weight.

8. The farm implement of claim 3, wherein the farm implement comprises a grain cart, and wherein one or both of the first suspension spring and the second suspension spring is configured to achieve maximum compression when the grain cart is at about twice its empty weight.

9. The farm implement of claim 3, wherein the farm implement comprises a grain cart, and wherein an angle of one or both of the first suspension axle and the second suspension axle relative to the main suspension axle is about 2° when the grain cart is empty, and about 0° when the grain cart is full.

10. The farm implement of claim 1, wherein a common longitudinal axis of the main axle passes through both the first and second ends of the main axle.

11. The farm implement of claim 1, wherein the main axle and the first and second suspension axles are each generally cylindrically shaped.

* * * * *